Sept. 15, 1959    S. C. LYONS    2,904,267
METHOD OF TREATING KAOLINITIC CLAY
Filed Sept. 16, 1957
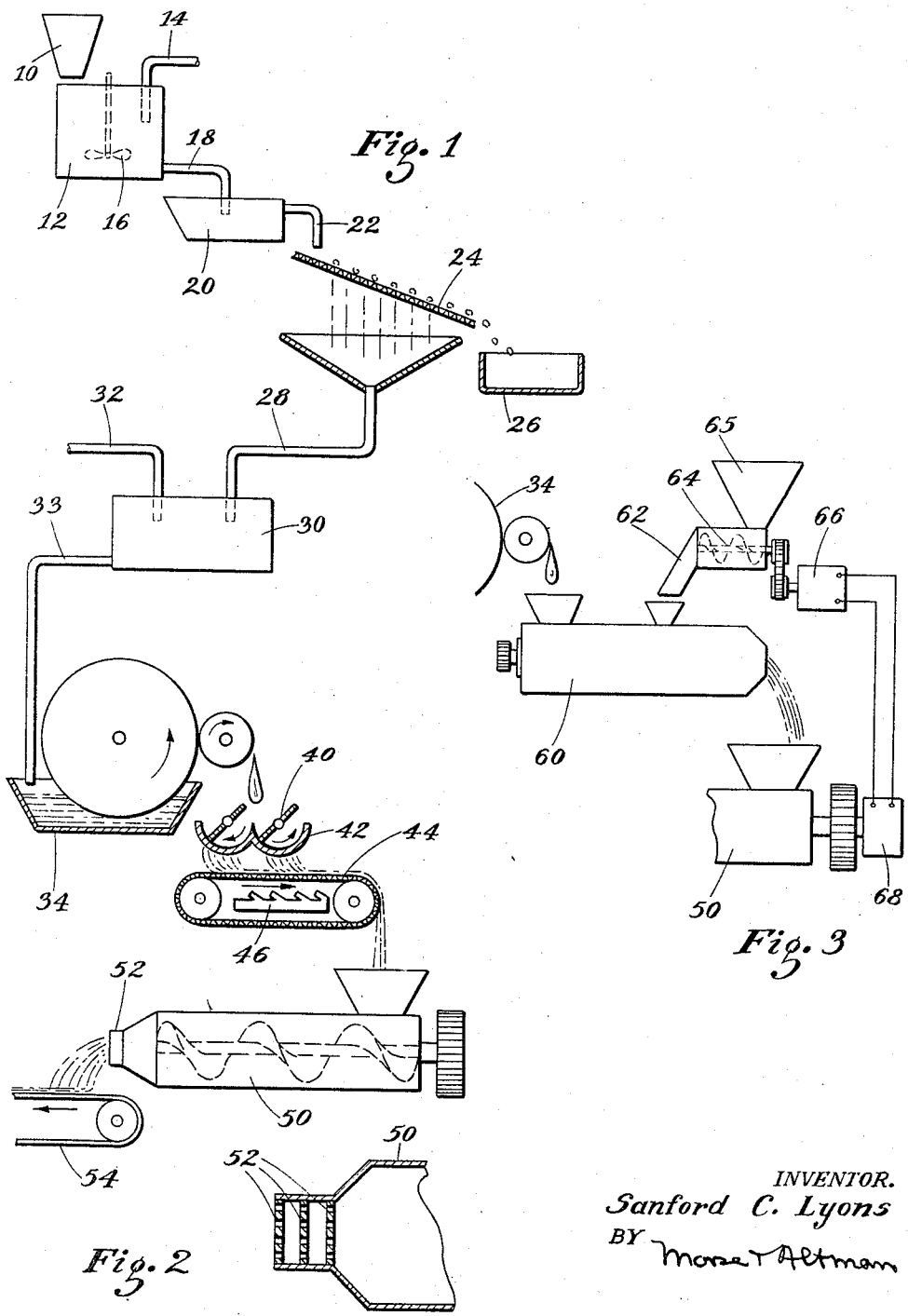
INVENTOR.
Sanford C. Lyons
BY Morse T. Altman 2,904,267
METHOD OF TREATING KAOLINITIC CLAY

Sanford C. Lyons, Bennington, Vt., assignor to Georgia Kaolin Company, Elizabeth, N.J., a corporation of New Jersey Application September 16, 1957, Serial No. 684,253

7 Claims. (Cl. 241—26)

This invention relates to a method of treating clay, particularly kaolin, to increase the percentage which can be utilized for certain purposes which require a fine particle size, that is, an equivalent spherical diameter of 2 microns or less.

Most high grade kaolins are prepared for use by a process known as "water washing." These are amply described in both the patent and the published art. The crude clay, as found in the mines, is blunged into an aqueous suspension in water either with or without the addition of deflocculating agents. While in this form it is relatively easy to remove oversize particles whether they be of kaolinite or accessory minerals such as mica, quartz, and other undesirable materials. The removal is effected either by sedimentation or by screening. It is thus a simple matter to obtain a product all of whose particles are finer than about 325 mesh (which corresponds roughly to a 43 mu diameter), this product being generally known in the industry as "washed" clay.

Fine as such a dimension is by ordinary standards it is still not nearly fine enough when considering products for certain industrial applications, such as the coating of paper or the reinforcing of rubber, etc. As was first pointed out by Maloney, U.S. Patent No. 2,158,987, the product qualities of a kaolin destined for use as a paper coating pigment are drastically improved if from this kaolin those particles coarser than about 2 mu diameter are either totally, or substantially all, removed. This discovery has been a keystone in the revolutionary expansion of the use of kaolin and in the production of slick-sheet coated papers for the publication of pictorial magazines, etc.

This discovery and its industrial development, however, has posed very serious problems for the kaolin manufacturer. He soon developed processes for the efficient segregation and removal of the particles coarser than 2 mu and these have been the subject of much patent and otherwise published prior art, e.g., Lyons Patent No. 2,085,538.

However, the fact that the desired clays are necessarily of such fine particle size has imposed a serious burden upon the kaolin industry from another aspect.

Many crude kaolins, for example those found in the Southeastern United States (whence most papermaking clays are now derived) contain an average of about 50% to 60% particles finer than about 2 mu diameter. This means then that even with efficient processes for the fractionation and segregation of the less than 2 mu particles from the greater than 2 mu particles, it is necessary to mine and process roughly 100 pounds of crude clay in order to obtain 50 to 60 pounds of finished coating clay of the desired particle fineness. Not only does this obviously bespeak a rapid depletion of the sources of crude material, but it also imposes another burden, viz., the disposition of very large quantities of the coarser kaolin which, while very fine by ordinary standards, is not sufficiently fine for the purpose at hand.

It is true that there have been found commercial applications—such, for example, as the filling of paper, certain so-called flat paints, some ceramic products, certain insecticide uses—which provide outlets for a modest proportion of these oversize kaolin particles.

Nevertheless, the demand for the very fine, viz., less than 2 mu particles for uses such as paper coating, etc. has expanded so much more rapidly than these other uses, that the kaolin producer is faced with the necessity and expense of building large impounds to collect and hold the greater than 2 mu particles since he cannot dispose of them to presently known markets.

With a situation of this sort facing the producer, as would be expected, diligent and exhaustive efforts have been made by the kaolin producers to find a way either to utilize the coarse particles as is, or to grind them so that they could be used for paper coating purposes.

Probably every known device for the comminution of solid materials has been tried at one time or another, but they have been so inefficient that they have appeared impractical.

While it is physically possible to grind a clay by means such as prolonged treatment in ball mills or very extensive and expensive treatment through high-speed colloid mills, the results obtained to date have indicated the production of materials which were not only far too costly to be of any commercial significance, but also the resulting product has usually been of inferior quality because its aqueous viscosity is often increased rather than decreased.

I have discovered that by treatment under conditions different from those heretofore utilized in the kaolin industry, I am able to achieve surprising increases in particle fineness and decreases in the viscosity of kaolins by the method of extruding them under very high pressures and within very narrow and closely controlled limits of moisture content during the extrusion process. In this fashion, by the above-mentioned extrusion process, even without the use of the conventional methods of fractionation (as by sedimentation processes), I am able to improve the fineness and the gloss producing properties of a kaolin destined for use in paper coating and other uses requiring small particle size.

This method of extruding kaolins under conditions of high pressures and closely controlled moisture content can be successfully employed not only with unfired kaolins but also with calcined kaolins in comminuted form which can be produced conveniently by any one of a number of well-known methods.

The comminuted kaolin particles can be reduced in average size by the method hereinafter described, under suitable conditions of high pressure and closely controlled moisture content.

The method of reducing average particle size by plastic shearing under conditions of heavy pressure and controlled percentage of moisture is effective with crude clay as well as with washed or refined kaolins, but the present application has to do more specifically with the latter, the results being believed to be more economical and practical, crude clay being almost invariably mixed with foreign matter which would interfere with orderly extrusion through small apertures.

As above noted, all high grade paper coating clays produced today are prepared by wet process or "washing" methods. In these the crude clay is first blunged up in water to form a slurry—with or without the introduction of an appropriate deflocculating agent—and then this slurry is subject to various classifying processes which remove the undesirable oversize particles. Subsequent to these classification steps, the resulting finer particle clay can be chemically decolorized or given other process treatments or it can be recovered from suspension by one of several different known filtering steps. The recovered clay issues from this initial dewatering step in the form of a plastic putty-like cake. The solids content of such cakes is almost never as high as 70% nor lower than 60% solids, and literally millions of tons of such filter press cake have been extruded as a preliminary step to further dewatering by thermal drying as indicated, for example, in Lyons Patent No. 2,032,624.

In spite of extensive utilization of this extrusion process in the kaolin industry for more than fifteen years, it is commonly considered that the extrusion treatment does not affect the inherent working properties of the kaolin product in any preceptible degree.

I have now found that if I extrude such a partially dewatered kaolin at a significantly higher solids content, e.g. from about 75% to 81% solids, and at a commercially feasible rate which requires a pressure of 350 pounds or more per square inch at an extrusion die having one or more perforations 3/16" in diameter, I do surprisingly and very significantly improve its properties. Not only do I markedly increases its particle fineness, but equally surprisingly, I decrease its viscosity. It is necessary to maintain the kaolin within the above prescribed limits of moisture content, and preferably at 79% solids content, in order to obtain these results effectively. If the moisture content is increased as much as 3% greater than the above-mentioned 25%, no significant change in either the particle size or viscosity is noted as a result of any practical amount of extrusion.

On the other hand, if the moisture content is decreased more than about 3% lower than the above-mentioned 19%, not only does the mass become so rigid as to be exceedingly difficult to extrude by any presently known method, but the desired effect of particle size reduction is realized in very much less degree.

In order to achieve the preparation of partially dewatered kaolin within the above prescribed solids contents limits (by methods which employ necessary elements of practicality), I either subject the clay to further drying until the moisture content is reduced to the desired percentage, or I may blend back into the clay sufficient dried clay of the same sort to bring up the solids content to the desired percentage.

I then extrude the mass under conditions of intensive hydraulic shearing as hereinafter described.

Crude kaolins as mined vary considerably in certain physical properties such, for example, as viscosity when mixed with water, and are accordingly processed for different commercial uses. For example, kaolins having a relatively high natural viscosity are used for ceramics and the like. Low viscosity clays are used for paper coating and filling, paint formulation and other uses requiring clay of that nature. In treating such clays according to the present invention, the optimum consistency will be different for clays of different natural viscosities.

It is more or less common practice to express the viscosity of kaolin destined for use, for example, in the paper industry, in centipoises when the viscosity of a fully deflocculated 71% solids slurry of clay has been measured by means of a Brookfield viscometer at 10 r.p.m. These techniques are described in the "Standard Test Methods" of the Technical Association of the Pulp and Paper Industry of New York city.

When I refer to a "low viscosity" kaolin I mean one the viscosity of which (as measured by the above method) is less than 500 centipoises. A "high viscosity" clay would be one ranging upward from this value—even to the extent that it might be off-scale at 71% solids but could be measured at some lower solids concentration.

While the nature of the causes of high viscosity in kaolin is not completely known, it is known that the degree of crystal perfection—which is related to the orderliness of stacking of the component atomic sheets in kaolinite crystals has a great deal to do with the viscosity of the clay. (See "Correlation of Paper Coating Qualities with the Grade of Crystal Perfection of Kaolinite" by H. H. Murray and S. C. Lyons, Proceedings of Fourth National Conference on Clays and Clay Minerals, National Research Council Publications No. 456, 1956, pp. 31–40.)

Also the presence of small amounts of non-kaolinitic clays such as montmorillonite which frequently occur in clays for ceramic purposes usually increases the viscosity of the kaolin enormously.

These variables of the kaolin usually require a different percent of moisture than those cited for low viscosity clays for efficient extrusion.

For practical purposes the range of percentages of water for efficient extrusion can usually be arrived at by making a viscosity determination of the clay. If the specimen falls within the range below 500 centipoises the optimum moisture content will usually be between 21% and 19%. However, if it has a higher viscosity than this, substantially higher than this, it is usually desirable to make an exploratory determination with the extrusion apparatus itself in order to more fully demarcate the percentage moisture required for efficient extrusion to obtain the desired result.

This reduction in average particle size usually results in a reduction in viscosity when the extrusion is carried out within the proper moisture limits.

Examples of experiments to illustrate these differences are hereinafter given, but since the treatment of the low-viscosity kaolinitic clays are at present considered to be far more important than the treatment of other types of clays, this application is concerned chiefly with such low-viscosity clays, and examples of other clays are given merely to show that the figures given for low-viscosity clays cannot be relied on when treating the other kinds.

Experimentally, a low viscosity kaolin, when extruded at 73% solids, passed through the die at 106 p.s.i. and easily yielded smooth extrusions with no significant improvement in physical properties. When the same clay was conditioned at 77% solids, it required 636 p.s.i. and the extrusions showed an increase of about 6% in the proportion by weight of "fines" (particles less than 2 mu equivalent spherical diameter), that is, an increase from an original 54% of fines to 60% after extrusion. This indicates that a high percentage of solids is required for the successful treatment of a slurry of low viscosity kaolin.

On the other hand, a slurry of a high viscosity clay, a typical high-viscosity kaolin, at 73% solids content required a pressure of 630 p.s.i., which indicates that such clay, the high viscosity of which is believed to be due to its poorly crystallized character, can be treated at somewhat lower percentages of solids.

As an example of kaolinitic clays containing a significant percentage (e.g. 3%–4%) of non-kaolinitic clay, a slurry of clay containing some montmorillonite with a solids content of 79% was extruded at 146 p.s.i. A slurry of 81% solids extruded at 265 p.s.i., while a slurry of the same clay of 83% solids extruded at 530 p.s.i. This clay thus required a relatively high solids content.

The process can be successfully employed not only with unfired clays, but also with calcined clays to reduce the average particle size by plastic shearing under conditions of heavy pressure and closely controlled moisture content. Since calcined clay cannot form with water a slip or slurry characteristic of unfired clay, the optimum moisture content of a calcined clay-water mixture is somewhat greater than that of the same clay in unfired condition. For example, a low-viscosity kaolin which has been calcined in comminuted form at 1000° C. was at 75% solids content dry and crumbly in appearance and could not be extruded. At 67%, the mass still seemed crumbly, but it did extrude successfully. Surprisingly, this calcined kaolin issued from the die orifices with the appearance of having a greater percentage of moisture than it had when it entered the extruder.

I have tried extruding unfired, low-viscosity clays at higher solids contents, e.g. 85%, but either one of two undesirable results were obtained, viz., the mass was too stiff to extrude, or it came through in crumbly, flaky form and did not exhibit the desired improvement in properties.

I find in this new process that many of the operating conditions and constants which were considered desirable in the earlier art are quite useless if one is to achieve the results sought. For example, the use of electrophoresis as described in said Patent No. 2,032,624 to lubricate the die-plate apertures in order to facilitate the extrusion of the soft plastic clay tends to defeat the purpose of the present invention. Likewise, if I seek to facilitate the passage of the clay through the die by addition of the optimum amount of deflocculating agent for maximum dispersion, as described and claimed for example in Patent No. 2,535,647 to Millman et al., I do not achieve the desired result, and if after adding a defloculant I build up the solids concentration so as to overcome the reduction in viscosity caused thereby, the clay mass becomes so dilatant as to be practically inoperable in the extruder.

For this reason, I find that I must now operate under conditions which not only were not contemplated by the prior art, but also were not attainable by methods at that time recognized as significant. So far as I know, no commercially feasible production of filter-press cake of paper-making clays is attainable with a moisture content lower than about 30%. As previously mentioned, I obtain the desired results in significant degree only if the solids content of the clay mass during extrusion is upwards of about 75% solids (low viscosity kaolin).

By means of photomicrographs of clay particles taken with electron microscopes which make possible magnifications of several thousand diameters, it has been observed that kaolin particles are in the form either of hexagonal plates or of "stacks." The plates vary somewhat in size but are rarely more than 2 microns equivalent spherical diameter. The stacks, on the other hand, are almost always greater than that value and as seen in the photomicrographs, consist of considerable numbers of plates adhering face to face. There is reason to believe that shearing stresses in stiff clay as it is being extruded through small orifices, e.g., $\frac{1}{16}''$ to $\frac{7}{16}''$ in diameter, break the elongated stacks into smaller stacks or possibly individual plates in some cases. When a fluid flows through a hole or tube, the layer of the stream next to the edge of the hole or the wall of the tube proceeds at a minimum velocity, the fluid in the middle of the stream flowing at maximum velocity. There is thus a differential of velocity which is progressive from the axis of the hole to the perimeter thereof. This is true of all fluids from gases which have a low viscosity to fluids which are almost solid and have a very high viscosity. The difference in speed of progress between particles which are adjacent but differently spaced from the axis of the hole or tube causes such particles to rub against one another. When, as in the case of clay having between 20% and 25% moisture content, a heavy pressure is required to extrude such clay through small openings, the plastic shearing stresses under such circumstances are great. This is believed to result in the breaking up of many of the stacks into smaller particles. Thus the average particle size of the mass of clay is reduced, the number of particles and especially the number of "fines" present in the mass being increased.

Apparatus for practicing the method described is diagrammatically illustrated in the drawing, of which—

Figure 1 is a flow diagram of such apparatus;

Figure 2 is a fragmentary sectional view, on a larger scale, of a part of the extruding machine shown in Figure 1; and Figure 3 is a diagram of additional apparatus which may be employed if desired.

A hopper 10 may be provided for the introduction of clay into a blunger 12, water and/or dispersing reagent, if desired, being supplied through a suitable pipe 14. The clay and water are mixed by a mixing paddle 16, the slurry being discharged through a pipe 18 into a degritting tank 20. The grit and other heavy matter settle out and are removed by any suitable means well known in the art, the washed clay slurry flowing off from the top of this container through a pipe 22 onto a screen 24 which is inclined so that the large lumps of clay, mica, etc. which are not disintegrated descend and are discharged into a suitable container 26. The slurry flows through the screen 24 and is conducted by a pipe 28 to a tank 30. Flocculating and/or bleaching reagents may be introduced as desired through a pipe 32 into the tank 30 to act upon the slurry therein. From the tank 30 a pipe 33 leads to a filter 34 in which the slurry is partially dewatered to form a clay mass having a water content of about 30%. The bleach and/or flocculation unit 30 is optional and may be omitted, in which case the pipe 28 would lead directly to the filter 34.

The clay mass from the filter 34 is then discharged into a drying unit having paddles 40 which rub the clay against sieves 42 forming rods of soft clay which are caught by a moving belt 44. Under the belt is a heating device 46 which is regulated to remove a specified additional percentage of the moisture from the clay. This heating device may be a series of nozzles through which heated air flows against the under side of the belt 44 or may be any other convenient means. The clay rods which are thus additionally dried to a moisture content of from 20% to 25% are then discharged into the hopper of a machine 50 for extruding the mass through the apertures in one or more dies 52.

For continuous operation of an extrusion machine, a machine with a feed-screw to push the clay against the die is desirable, but in some cases it may be preferred to employ a ram or piston type of mechanism for that purpose. To obtain an effective shearing action in the clay mass, there must be maintained at the die plate a pressure which is related to the size of the orifices in the plate. For example, when treating kaolins of the low voscosity type such as are used for paper coatings and the like, containing 21% moisture, pressures from 700 pounds to 1000 pounds per square inch were required to force the masses through apertures of $\frac{3}{16}''$ diameter at a rate which resulted in a differential flow through each aperture necessary to produce the desired shearing effect within the clay. A high viscosity clay such as is used for ceramics required only about 350 pounds pressure at the die plate for a mass having 19% moisture. In this latter example, there were indications that a lower moisture content would have given more shearing action in the mass. Since the clay mass which is thus extruded is of a very thick consistency, the extrusion machine 50 must be heavily built and must be strongly powered. The magnitude of the pressures employed will be limited only by the strength of the extrusion machine or the amount of power used to drive it. The extruded material is caught by a conveyor belt 54 or other suitable receptacle and is carried off for further treatment.

In the extruding machine a single perforated die may be used and the clay recirculated through it for repeated extrusions, such operations having a cumulative effect on the clay, or a series of two or more dies may be employed in the machine to obtain an equal number of extrusion operations with a single pass. Where a plurality of such dies are employed, the perforations in the successive dies may be of the same size or progressively smaller. The perforations in the successive dies are preferably but not necessarily out of alignment in the direction of movement of the clay.

In extrusion machines having feed-screws to force the clay against and through the die or dies, not all of the effective treatment of the clay occurs at the die. Considerable fracturing of individual clay particles occurs in areas within the feed-screw casing where pressure conditions are sufficiently high and the movement of the feed-screw causes adjacent layers or particles of clay to rub on one another, the clay mass having the proper moisture content (21%) for the purpose, having due reference also to the type of clays being treated.

Instead of discharging the filtered clay from the filter 34 to the dryer, it may be delivered to a pug mill 60, conventionally shown in Figure 2. As it is stirred in the pug mill by the customary paddles, dry clay is added through a chute 62 by a feed screw 64 from a supply 65. The feed screw 64 is operated by a motor 66 controlled by means 68 (not shown in detail) responsive to pressure conditions within the extruder 50 or, as indicated, responsive to torque developed in the rotation of the feed screw within the extruder 50. If for example the torque impressed on the shaft of the extruder falls below a predetermined figure, that indicates a drop in the vicosity of the clay mass which means it has too high a moisture content. The control unit 68 thereupon operates to increase the rate of feed of dry clay from the unit 64 so as to increase the percentage of solids in the mixture being fed to the extruding mechanism 50.

I claim:

1. A method of materially reducing the average particle size of finely divided calcined kaolinitic clay which comprises making a clay-water mixture having a solids content in excess of about 65% and a moisture content sufficient to permit extrusion of the mixture through a 3/16" die aperture, and forcing said mixture through die apertures of approximately 3/16" at pressures of at least 350 pounds per square inch.

2. A method of materially reducing the average particle size of kaolinitic clay, which consists of making a clay-water mixture of such consistency as would undergo an intensity of internal plastic shearing resulting in an increase of several percent in the proportion by weight of particles therein no greater than 2 mu equivalent spherical diameter if said mixture were forced through a 3/16" die aperture under a pressure of not less than 350 p.s.i., and subjecting said mixture to such plastic shearing.

3. A method of materially reducing the average particle size of washed kaolinitic clay, which consists of making a clay-water mixture of such consistency as would undergo an intensity of internal plastic shearing resulting in an increase of about 6% in the proportion by weight of particles therein not greater than 2 mu equivalent spherical diameter if said mixture were forced through a 3/16" die aperture under a pressure of not less than 350 p.s.i., and subjecting said mixture to such plastic shearing.

4. A method of materially reducing the average particle size of kaolinitic clay, which consists of making a clay-water mixture having a sufficient percentage of kaolinitic clay to require at least 350 p.s.i. to force it through a 3/16" die aperture and a sufficient percentage of moisture to permit the mixture to be extruded through a 3/16" die aperture in a non-crumbly and non-powdery form, and subjecting said mixture to internal plastic shearing forces sufficient to increase by about 6% the percentage by weight of the particles in the mixture of a size not greater than 2 mu equivalent spherical diameter by extruding the mixture under pressure of at least 350 p.s.i.

5. A method of materially reducing the average particle size of washed kaolinitic clay, which consists of making a clay-water mixture having a sufficient percentage of kaolinitic clay to require at least 350 p.s.i. to force it through a 3/16" aperture and a sufficient percentage of moisture to permit the mixture to be extruded through a 3/16" die aperture in a non-crumbly and non-powdery form, and subjecting said mixture to internal plastic shearing forces sufficient to increase by about 6% the percentage by weight of the particles in the mixture of a size not greater than 2 mu equivalent spherical diameter by extruding the mixture under pressures of at least 350 p.s.i.

6. A method of materially reducing the average particle size of washed kaolinitic clay, which consists of making a clay-water mixture having a sufficient percentage of kaolinitic clay to require at least 350 p.s.i. to force the mixture through a 3/16" die aperture and a sufficient percentage of moisture to permit the mixture to be extruded through a 3/16" die aperture in a non-crumbly and non-powdery form, and extruding the mixture through a die aperture having a diameter of from 1/16" to 7/16" under pressures sufficient to result in an increase of about 6% in the percentage by weight of particles in the mixture of a size not greater than 2 mu equivalent spherical diameter.

7. A method of materially reducing the average particle size of washed kaolinitic clay, which consists of making a clay-water mixture having a solids content within the range of 73% to 83% and a consistency stiff enough to require at least 350 p.s.i. to force it through a 3/16" die aperture but extrudable through said aperture in a non-crumbly and non-powdery form, and extruding the mixture through an aperture between 1/16" and 7/16" in diameter under a pressure not less than 350 p.s.i.

References Cited in the file of this patent

UNITED STATES PATENTS

| 216,958 | Hudson | July 1, 1879 |
| 2,318,142 | Cox | May 4, 1943 |
| 2,560,082 | Brown | July 10, 1951 |